Figure 1A:
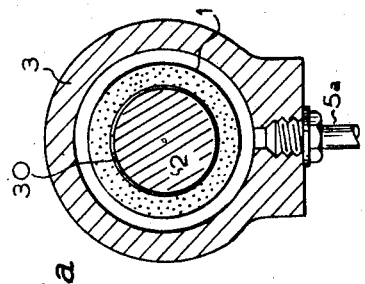

Oct. 7, 1958 P. GÉRARD 2,855,249
PERMEABLE FLUID BEARING
Filed May 21, 1953 3 Sheets-Sheet 1

Inventor
Paul Gérard
by Brown & Seward
Attorneys

Oct. 7, 1958 P. GÉRARD 2,855,249
PERMEABLE FLUID BEARING
Filed May 21, 1953 3 Sheets-Sheet 2
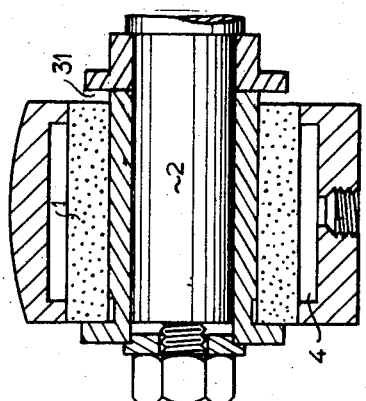
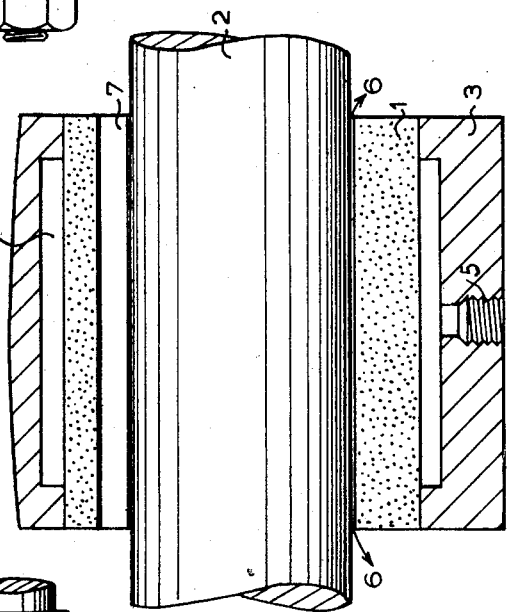
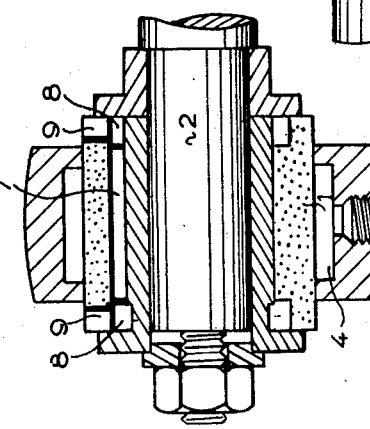
Inventor
Paul Gérard
by
Attorneys Oct. 7, 1958 P. GÉRARD 2,855,249
PERMEABLE FLUID BEARING
Filed May 21, 1953 3 Sheets-Sheet 3
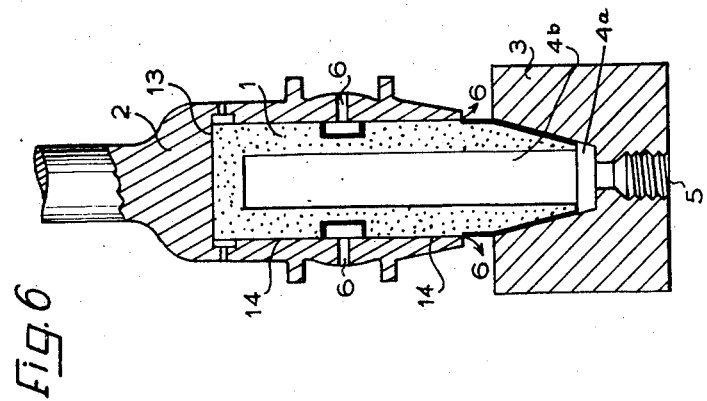
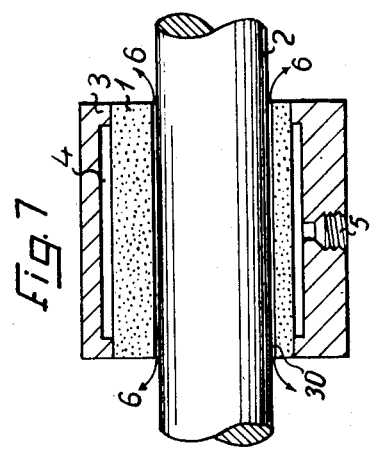
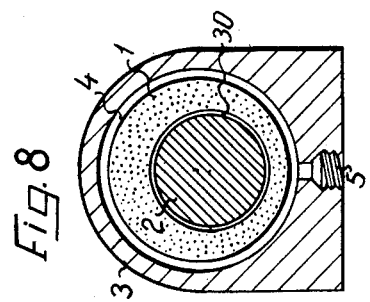
Inventor
Paul Gérard
by Brown & Seward
Attorneys

United States Patent Office 2,855,249
Patented Oct. 7, 1958

2,855,249

PERMEABLE FLUID BEARING

Paul Gérard, Paris, France, assignor to Societe d'Etude et d'Exploitation du Palier Fluide (S. E. E. P. F.), Lyon, Rhone, France, a company of France Application May 21, 1953, Serial No. 356,566

Claims priority, application France May 23, 1952

1 Claim. (Cl. 308—122)

The present invention relates to bearings and the like.

In a known type of bearings, the so-called self-lubricating bearings, the bearing surface is provided in a porous metal sleeve which is usually pretreated by being placed, for many hours, in a bath of oil or other lubricant until it is saturated therewith. In operation, these bearings ensure, by an exudation effect, a sufficient lubrication without requiring any renewal of lubricant for relatively long periods of time. It is also known to provide such self-lubricating bearings with a renewable stock of oil under a certain pressure, said oil being fed to the bearing surface through the pores of the permeable metal sleeve. It is even known to create a continuous renewal of the lubricant by permanently feeding the same from a suitable source, so as to maintain a proper lubricating film around the rotary member.

However, all self-lubricating bearings are capable of operating in good conditions only if the degree of viscosity of the lubricant and the peripheral speed of the shaft, or other rotary member are comprised within a certain range. Moreover, even in the case when the lubricant is continuously fed to the bearing, its static pressure is never sufficient to support the rotary member out of metal to metal contact with the bearing, primarily at rest.

On the contrary, in another type of known bearings, the so-called fluid bearings, the rotary member is floatably supported in a non porous sleeve by a continuous flow of a supporting medium circulating through an annular clearance deliberately provided between the rotary member and the bearing surface with a sufficient pressure to support said rotary member out of metal-to-metal contact with the bearing, whatever the speed of the rotary member.

Fluid bearings of this type have been disclosed, for example, in my co-pending application Serial No. 240,959, filed August 8, 1951 (as a continuation in part of application Serial No. 699,051, filed September 24, 1946, and now abandoned), now Patent No. 2,660,485, issued November 24, 1953; in Gerard and Seranne application Serial No. 172,166, filed July 8, 1950, now Patent No. 2,660,484, issued November 24, 1953; and in my application Serial No. 207,869, filed January 26, 1951, now Patent No. 2,634,176, issued April 7, 1953.

The main difference between self-lubricating and fluid bearings is that, in the latter, any fluid, liquid or gaseous, viscous or non viscous, may be used as a supporting medium, while, in self-lubricating bearings, the fluid is necessarily a lubricant.

Fluid bearings have the essential advantage that the already mentioned suppression of any metal-to-metal contact between the shaft and the bearing surface permits reducing to a minimum wear, friction and other drawbacks.

It is particularly interesting to feed such bearings with a substantially non-viscous fluid to still more reduce the friction on the rotary member. Fluid bearings give excellent results, in particular, for high speeds of rotation, as well as when a high accuracy of centering is required. Unfortunately, the design of the pressure fluid bearings offers a certain complexity due, in particular, to the fact that the feeding of the supporting pressure medium is necessarily ensured, if a good balance of the rotary member is to be obtained, through an intricate network of ducts, passageways, grooves, channels, etc., extending through the wall of the bearing sleeve or liner.

It has also been proposed to force fluid lubricant into the annular clearance space between the bearing surface and a rotary member through a porous sleeve forming said bearing surface and made of oil free graphitized carbon material. However, due to the comparatively small pore volume existing in such graphitized carbon bearing sleeve, the permeability thereof (that is, the rate of diffusion of the fluid lubricant forced through substantially the entire porous bearing surface) is such that the volume of fluid lubricant escaping through the porous sleeve is insufficient to create a lubricant film capable of supporting the rotary member in spaced relation to the interior wall of the bearing sleeve, and it is mainly the pressure wedge created by rotation of the rotary member and the shear forces in the lubricant film which tend to produce a balancing force opposing an applied radial load. Now, since the pressure of the lubricant film developed by shear of the lubricant depends upon a certain speed of the rotary member, there is an eccentric displacement of the rotary member with respect to the bearing surface when rotation stops; high starting friction losses are avoided by the fact that when the rotary member comes into contact with the bearing surface, it rubs on the graphite which acts as a lubricant.

The main object of my invention is to provide a fluid bearing in which the continuous feeding of a supporting medium under a convenient pressure into the above mentioned deliberately provided annular clearance is ensured through the natural ducts of a bearing sleeve made of a highly permeable material, that is, having a relatively great natural pore volume.

With this arrangement, the feeding of the annular clearance is ensured through a high plurality of inlets uniformly distributed therearound.

There is thus provided, in a permeable fluid bearing according to the invention, a better distribution of the supporting medium pressure flow than in any known fluid bearing. Moreover, such a bearing is extremely cheap since porous liners, or sleeves of any desired type may be easily found on the market, which permits avoiding the costly and painstaking operations of forming an intricate network of passages as in the sleeves and liners disclosed in the above cited copending applications.

Furthermore, the permeable fluid bearings according to the invention are particularly well adapted to the use of compressed air as a supporting medium, which permits practically suppressing any friction on the rotary member at any speed thereof, since they do not give rise, as do the known compressed air bearings, to vibrations at certain critical speeds, so that a rotary member journalled in such a bearing is practically not subjected to any speed limitation. This is due to the fact that the thin annular supporting air flow, instead of being divided into a plurality of limited areas, extends around the whole inner surface of the porous sleeve and acts as a vibration damper having a maximum efficiency.

In the specification, as well as in the appended claims, the word "bearing" is intended to cover any bearing structure interposed between two members imparted with relative rotation, such as an annular bearing completely enclosing a shaft journalled therein, a cradle-shaped pillow extending around a portion only of a shaft supported thereon, a journal or trunnion for pulleys or the like, a thrust bearing, combined radial and thrust bearings, etc.

It is to be understood that the degree of permeability of the porous metal sleeve should be chosen in dependency on the working conditions of the respective cases, as will be easily determined by a few preliminary tests.

However, a more particular object of the invention is to provide a permeable fluid bearing of the type described, in which the degree of permeability of the sleeve or liner is so chosen that the mean static pressure within the annular fluid flow separating the shaft from said liner has a value substantially equal to half the feeding pressure.

As a matter of fact, computations and experiments have shown that, due to the uniform distribution ensured by the huge number of inlets constituted by the pores of the sleeves, a bearing according to the invention is capable of opposing any variation of the radial position of the shaft with a variation of the resultant of the pressures within the fluid flow interposed between the shaft and the bearing. This property, which will be called hereunder "centering power," is optima with the particular value of permeability mentioned in the last paragraph.

In the most simple embodiment of the invention, a porous sleeve adapted to support a shaft or other rotary member with a deliberately provided annular clearance therebetween is housed in a suitable casing within a chamber fed from a source of pressure fluid and the evacuation of said fluid from said annular clearance takes place naturally through the ends of said clearance between said rotary member and said sleeve, the feeding pressure and the whole design being such that the static pressure within the annular clearance is sufficient to floatably center the rotary member permanently and even at rest.

Now, to improve the uniform distribution of the fluid around the rotary member, it is a further object of the invention to give the feeding chamber provided around the porous sleeve an annular shape, said chamber being preferably fed at its lowest portion.

The centering power is the most noticeable near a low pressure evacuating zone. It is therefore suitable to provide as many evacuating zones as possible in the bearing to increase its centering power.

A further object of the invention consists in the provision of positive means, such as longitudinal grooves for evacuating the supporting medium from the annular clearance and constituting such additional evacuating zones.

Another object of the invention is to control and direct the flow of the supporting medium through the press of the liner in such a manner as to carry efficiently the load and resist the forces that are developed in the bearing during use.

A feature of the invention which contributes to the accomplishment of this object consists in forming the sleeve of powdered metal and in casting, sintering or, otherwise, machining the metal, in such a manner that the pores are sealed in certain areas of the liner, which permits controlling the input of supporting medium through predetermined portions of the liner in order to meet and oppose in a satisfactory manner the forces and stresses that occur during the operation of the bearing.

Figure 2:
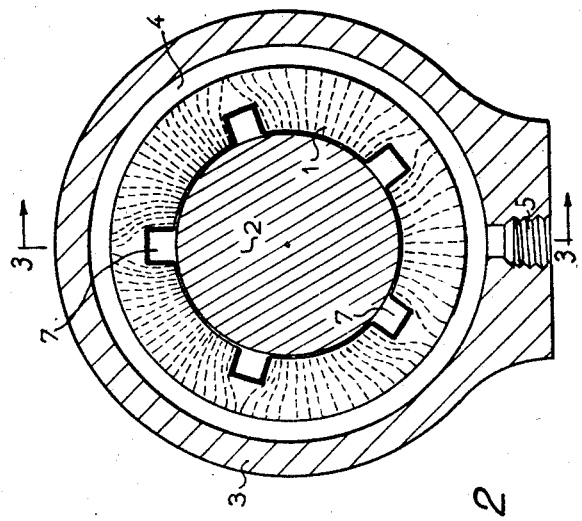
Figure 1:
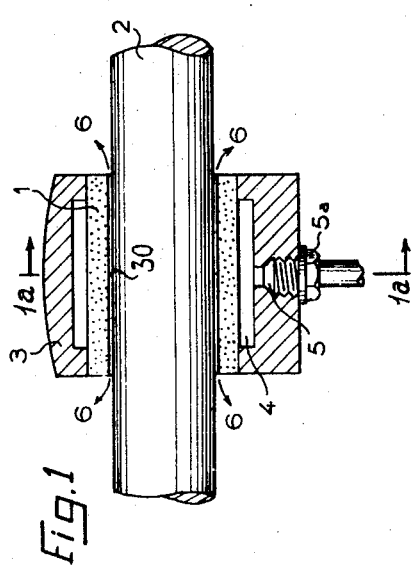

Other objects and advantages of the invention will become apparent from a reading of the following specification in the light of the accompanying drawings, in which:

Fig. 1 is an axial longitudinal sectional view of the most simple embodiment of a porous fluid bearing according to the invention, Fig. 1a is a cross sectional view along line 1a—1a of Fig. 1, Fig. 2 is a cross sectional view of another embodiment in which the bearing is provided with longitudinal evacuating grooves, Fig. 3 is a longitudinal sectional view along line 3—3 of Fig. 2, Figs. 4 and 5 are longitudinal sectional views of another embodiment in which the bearing is provided with abutments limiting the axial displacement of the shaft in the bearing, Fig. 6 is a longitudinal sectional view of an embodiment of a journal or trunnion according to the invention, Figs. 7 and 8 are longitudinal and transversal sections, respectively, of an alternative embodiment in which the annular porous member is comprised between non-concentric cylindrical surfaces.

As shown in Figs. 1 and 1a, a bearing according to the invention is constituted, in its most simple shape, by a porous cylindrical sleeve 1, having a uniform thickness and adapted to journal, with a deliberately provided annular clearance, a shaft 2. Sleeve 1 is housed in an impervious casing 3 provided with an annular chamber 4 continuously fed with a pressure fluid, such as compressed air, as shown at 5, from a suitable source (not shown), through an inlet 5a.

This bearing operates as follows: the fluid fed at 5 is distributed within chamber 4, passes through the porous partition 1, flows in an annular formation distributed around shaft 2 in the clearance 30 comprised between said shaft and sleeve 1 and is finally evacuated at 6 through the ends of the bearing into a lower pressure zone which may be atmosphere when the bearing is fed with compressed air.

When the shaft is exactly centered in the bearing, if the latter is fed symmetrically in a given plane normal to its axis, the static pressure in the fluid flow is the same all around the shaft, while, when the shaft is shifted, the pressure in said flow is increased in the area where the cross-section of the fluid flow is reduced and conversely; moreover, the variations of the fluid pressure in the bearing are the most noticeable near a lower pressure zone. Generally speaking, it is therefore suitable to provide as many low pressure evacuating zones as possible to thereby increase the centering power of the bearing. In particular, the internal surface of the bearing will be advantageously divided into a certain number of separate bearing areas by means of longitudinal grooves to be used for evacuating the fluid towards a lower-pressure zone. Such grooves are shown, e. g. at 7, in Figs. 2 and 3.

A permeable sleeve is advantageously made of a sintered metal. In this case, as described in the preamble, it is interesting to make certain portions of the bearing surface impervious in order to avoid waste of fluid. This result may be easily obtained by a mere subsequent machining. Thus, the longitudinal grooves 7 of Figs. 2 and 3, the walls of which should be preferably impervious, may be subsequently broached and, more generally, machined for this purpose.

Such a machining has for its effect to obturate at least a major portion of the pores of the metal in the machined area, as shown by the reinforced lines, so that no objectionable fluid passage then takes place between chamber 4 and the grooves 7. The fluid flow through partition 1 is thus by-passed around the impervious areas. It will be seen hereunder that it is particularly interesting to machine in this manner grooves or channels used for evacuating the supporting medium, while the feeding nearly always takes place through the natural ducts of the porous sleeve.

To obtain a combined radial and thrust bearing, the permeability of the ends of sleeve 1 may be used for creating and maintaining a film of fluid under pressure between the terminal faces of said sleeve and abutment faces provided on the shaft. If the thrust bearing has to support but limited axial stresses and/or in the case when the axial clearance 31 has not to be limited to an extremely reduced value, it is possible to adopt the arrangement shown in Fig. 4. Otherwise, it is preferred to create a low-pressure zone at the ends of the bearing under the shape of circular grooves 8 (Fig. 5) communicating with the discharge, e. g. through radial passage ways 9 which will be advantageously disposed in the plane of the longitudinal grooves 7, if the bearing is of the type disclosed in Figs. 2 and 3.

As mentioned in the preamble, the invention is adapted to any bearing structure of any shape and design, the essential feature of the bearing being the use of a permeable partition through which is circulated a liquid or gaseous supporting medium fed from a suitable pressure source.

In particular, while all above described structures are female bearings, it is to be understood that male bearings, or journals, may be easily designed within the scope of the invention.

In the example shown in Fig. 6, 1 is a stationary pivot constituted, as in the previously described embodiments, by a porous sleeve and 2 designates a hollow rotor which is journalled on pivot 1. 3 is a fixed support in which is provided an inlet 5 feeding a chamber 4a constituted by the bottom of a frusto conical recess in which pivot 1 is fixedly secured. The inner space 4b of pivot 1 constitutes an extension for the feeding chamber 4a and the supporting medium is fed into the annular clearance between rotor 2 and the porous sleeve 1 through the natural pores of the latter from chambers 4b—4a. Outlets 6 are provided in the wall of rotor 2 to ensure permanent evacuation of the supporting medium from the above mentioned annular clearance.

In Fig. 6, the reinforced lines indicate the impervious areas of the outer surface of the porous sleeve. It may be easily seen that, thanks to the presence of said impervious areas, the supporting medium fed in chamber 4a—4b necessarily flows only towards the active bearing area of the porous sleeve. Moreover, in this example, said area is divided into two bearing portions 14 by an impervious circular groove shown in reinforced lines and a terminal axial abutment shown at 13 ensures axial floating of rotor 2.

All the bearings which have been described hereabove include a porous liner having a uniform thickness along its whole axial length.

Now, in certain cases, it may be important to create preferential zones of pressure in certain radial areas of the bearing, e. g. to compensate the weight of the shaft or, more generally, a load applied to the same in a well-defined direction. Such a dissymmetric bearing may be devised in various manners.

As an illustration, there is shown, in Figs. 7 and 8, a bearing in which the porous sleeve 1 is limited by two non-coaxial cylindrical surfaces. In the example shown, the axis of the inner surface of porous sleeve 1 is offset downwardly to increase the pressure in the lowest portion of the annular clearance 30 provided between shaft 2 and said sleeve 1. Otherwise, this bearing is designed and operates as described with reference to the preceding figures.

While the invention has been described with particular reference to preferred embodiments, it is not intended to limit the scope of the invention to these embodiments, otherwise than by the terms of the subjoined claim.

In particular, the shape of the porous sleeve may be varied at will according to the respective particular cases as well as the number and areas of the impervious portions provided on the active surfaces of the bearing to control the direction and rate of flow therethrough.

What is claimed is:

A bearing structure comprising a fixed member and a rotatable member journaled in said fixed member, the fixed member including a sleeve made of highly permeable material having inner and outer cylindrical surfaces, one of said surfaces supporting said rotatable member with an annular clearance space therebetween, said clearance space communicating with atmosphere, a feeding chamber having one of its walls constituted by the other one of said surfaces, and means for supplying compressed air to said chamber to create a continuous flow of compressed air from said chamber, through said sleeve and said clearance space, to atmosphere under such a pressure that the compressed air within said clearance space maintains said rotatable element in a centered position with respect to said sleeve, the bearing surface of said sleeve being further provided with longitudinal grooves communicating with atmosphere and at least portions of the walls of said grooves being made impervious.

References Cited in the file of this patent
UNITED STATES PATENTS

| | | |
|---|---|---|
| 2,054,055 | Klahn | Sept. 8, 1938 |
| 2,318,114 | Tichvinsky | May 4, 1943 |
| 2,449,297 | Hoffer | Sept. 14, 1948 |
| 2,645,534 | Becker | July 14, 1953 |
| 2,696,410 | Topanelian | Dec. 7, 1954 |

FOREIGN PATENTS

| | | |
|---|---|---|
| 402,277 | Italy | Feb. 25, 1943 |
| 454,557 | Canada | Feb. 15, 1949 |